Nov. 2, 1954  R. BECK  2,693,112
THERMOMETER
Filed Nov. 10, 1950

Inventor
Rudolf Beck
by Roberts, Cushman & Grover
Attys

United States Patent Office 2,693,112
Patented Nov. 2, 1954

2,693,112

THERMOMETER

Rudolf Beck, Fairfield, Conn., assignor to Manning, Maxwell & Moore, Inc., New York, N. Y., a corporation of New Jersey Application November 10, 1950, Serial No. 194,990

5 Claims. (Cl. 73—369)

This invention relates to indicator instruments and more especially to dial thermometers of the fluid pressure type having an indicating head in which there is indicia and an indicator arranged for relative movement, and a stem connected to the head containing an element sensitive to changes in ambient conditions, to wit, pressure sensitive means for effecting such relative movement with reference to the indicia. To adapt such instruments for various installation locations, the stems have been supplied extending backwardly from the head downwardly therefrom or sidewardly therefrom. According to one design the stem was connected to be rotated through an angle of 180° in one plane. The principal objects of this invention are to provide an instrument of the foregoing kind in which the head may be moved angularly with reference to the stem to right it with respect to the observer, so that regardless of the place in which it is used it may be read easily and accurately. Further objects are to provide a comparatively simple structure for affording the foregoing orientation of the head relative to the stem which does not interfere with the means for effecting transmission of the changes to the indicator. Still further objects are to make available an instrument which is durable and which may be used for substantially any installation, thus making it unnecessary to manufacture several different types of instruments for different installations and unnecessary to keep on hand an inventory of a number of different types of instruments.

As herein illustrated, the head of the instrument contains the indicating elements, while a stem contains an element sensitive to changes in ambient surroundings, that is a temperature sensitive bulb, and a capillary tube which extends therefrom and from the stem into the head for effecting operation of the indicating elements by pressure changes produced in the bulb by ambient temperature changes. In accordance with this invention the head and stem are joined by means which permits angular tilting movement of the head relative to the stem through 180° and angular turning movement about a line perpendicular to its face through 180°, that is adjustment of the head relative to the stem through 180° in any plane passing through an axis perpendicular to the face of the thermometer head. The connection is afforded by an articulated bracket comprised in part of a bridge portion and spaced legs between which is mounted one end of the stem containing the sensitive element or bulb and capillary tube for turning about an axis passing through the legs at right angles to the axis of the stem. The head is fastened to the bridge piece for rotation about an axis perpendicular thereto and to the plane of its face. The capillary tube extends from the stem through the bracket to the indicating means in the head and has within the bracket a portion yieldable about the axis of rotation of the stem and a second portion yieldable about the axis of rotation of the head. The yieldable portions are in the form of a cylindrical coil formed by turns of the capillary tube located about the axis of rotation of the head with reference to the bracket, which constitutes a stud fixed to the bracket.

The invention will now be described in greater detail with reference to the accompanying drawings wherein.

Figure 1:
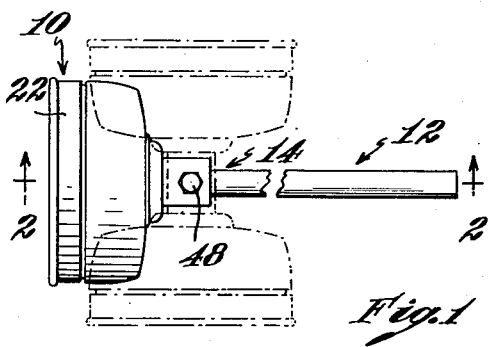
Fig. 1 is a plan view of the instrument showing the indicator head in its normal position (full lines) that is with the stem at right angles to its face, and in positions (dotted lines) at right angles thereto.
Figure 4:
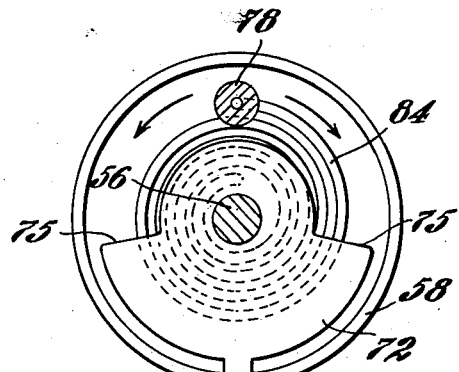
Figure 2:
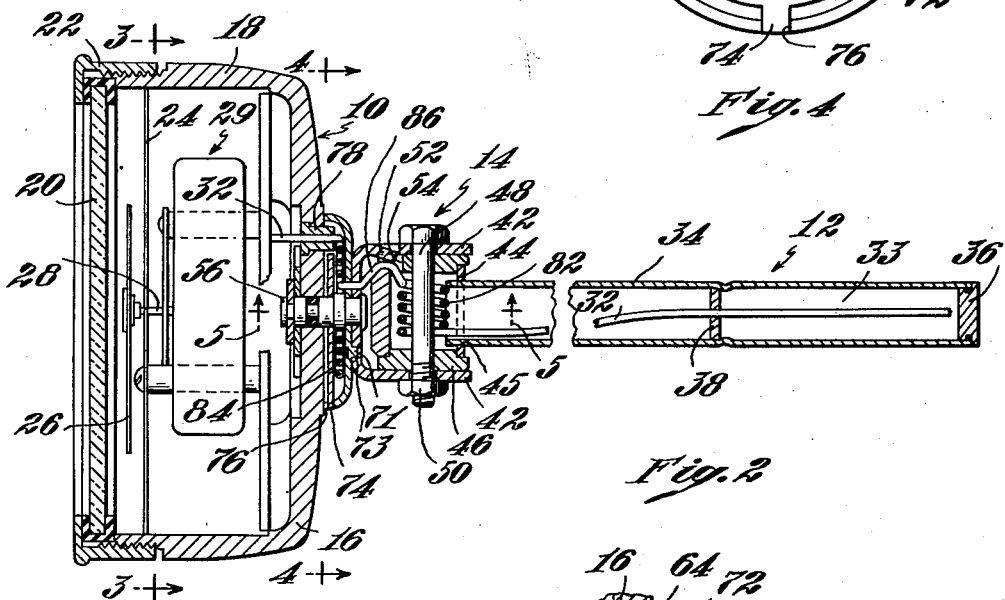
Fig. 2 is an enlarged vertical section through the head and stem of the instrument taken on the line 2—2 of Fig. 1 showing the universal joint permitting adjustment of the head relative to the stem and passage of the capillary tube from the stem through the articulate bracket into the head.
Figure 3:
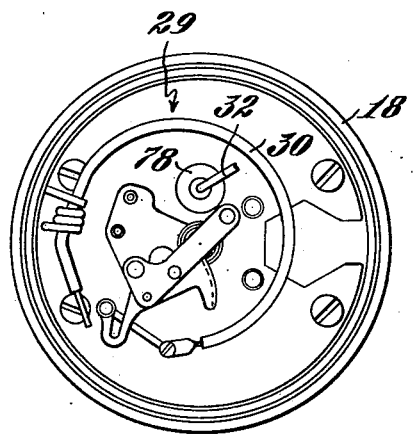
Fig. 3 is a vertical section to small scale taken on the line 3—3 of Fig. 2 showing the indicator actuating mechanism and its connection to the capillary tube.
Figure 5:
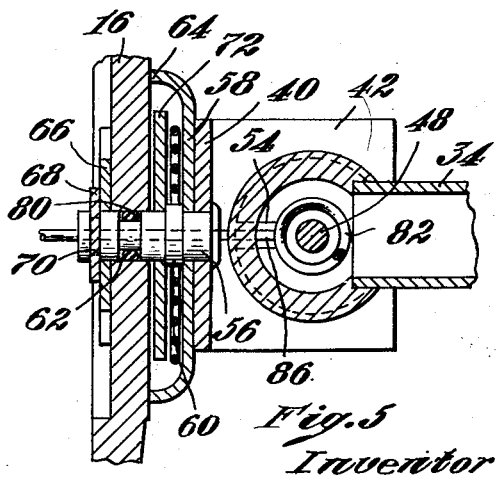

Fig. 4 is a vertical section taken to smaller scale on the line 4—4 of Fig. 2 showing the flat coil in the capillary tube permitting rotation of the head in the plane of its face with reference to the stem; and Fig. 5 is an enlarged fragmentary detail in section taken on the line 5—5 of Fig. 2, showing the manner in which the head is connected to the articulated bracket for rotation about an axis perpendicular to its face.

Referring to the drawings, the instrument comprises an indicator head 10 and stem 12 connected for universal movement, that is angular movement relative to the stem through 180° in any plane passing through an axis perpendicular to the head, by an articulated bracket 14. The head 10 has a back 16, a forwardly extending circular wall 18, and an open front covered by a glass 20 held in place by a threaded cap ring 22. Within the head there is an indicia-bearing dial 24 and an indicator 26 mounted on a staff 28 for rotation relative to the indicia on the dial. The staff 28 is turned in one direction or the other to indicate changes in the conditions being measured by a conventional pressure motor 29, including a Bourdon tube 30, expansion and/or contraction of which is effected by pressure changes of a fluid within a thin-walled bulb located in the stem and connected thereto by a capillary tube 32 which extends from the Bourdon tube and from the head through the articulate bracket into the stem 12. Since the mechanism for the motor 29 is well known the details thereof will not be described herein.

The stem 12 is in the form of a hollow tube 34. The sensitive element or bulb is formed towards the outer end of the stem by the plugs 36 and 38 which are pressure tight, the latter being pierced to permit the capillary tube 32 which constitutes a part thereof to pass therethrough into the bulb. The end of the capillary tube within the bulb is open.

The articulate bracket 14 for connecting the stem 12 to the head 10 includes a bridge piece 40 having spaced parallel legs 42 extending at right angles thereto. A sleeve 44 is placed between the legs with its axis parallel to the bridge and in the open ends of the sleeve between each end and the adjacent leg is seated a disc 46. The legs 42 and discs 46 have holes therein in registry and through these holes there is placed a headed bolt 48 having a nut 50 on one end located at the outside of the leg which may be turned to draw the legs toward each other, frictionally to engage the discs within the open ends of the sleeve 44 and hence to control the freeness of rotation of the sleeve 44 about the axis of the bolt 48. Thus the stem may be rotated to a suitable position and will remain at this position until manually rotated to a new position. The sleeve 44 has an opening 45 in its wall into which the open end of the stem 34 is inserted and welded. As thus constructed, the stem may be rotated about the axis of the bolt between the legs 42. One of the discs 46 is prevented from rotation for a reason which will appear hereinafter, by engagement of a prong 52 struck inwardly from one of the legs 42 so as to engage within an opening 54 in the form of a radial slot cut in the disc.

A stud 56 is fixed in the bridge 40 so as to extend at right angles therefrom and a dish-shaped washer 58 is placed over the stud against the bridge piece. The back 16 of the head has an opening 62 centrally thereof and is placed over the end of the stud so that the rear face of the back 16 engages the rim 64 of the dish-shaped washer 58. The head is firmly held against the rim of the dish-shaped washer by a spring washer 66 mounted on the stud against the inner face of the back 16 and held thereagainst by a split spring washer 68 set into a groove 70 cut into the stud. As thus constructed, the head may be turned to a given position and will remain at this position until further turned by hand. The dish-shaped washer 58 is fixed, that is held from rotation relative to the bridge 40 by a pin 71 extending rearwardly therefrom through a hole 73 in the bridge. Rotation of the head relative to the dish-shaped washer and hence the bracket, is controlled and limited by a plate 72 mounted on the stud between the back of the head and the collar 60, which has on it a radial finger 74 (Fig. 4) extending through a slot 76 in the wall of the dish-shaped washer near its rim so that it is fixed with reference to the dish-shaped washer. The plate 72 has a portion thereof cut away to provide a pair of radially extending shoulders 75—75. In the back 16 of the head there is inserted a grommet 78 through which passes a portion of the capillary tube 32 on its way to the stem and the rear end of this grommet extends beyond the back face of the head sufficiently so that when the head is rotated a sufficient distance in either direction the projecting portion of the grommet will contact one or the other of the shoulders 75—75. Thus the combination of the grommet and the shoulders 75—75 constitute limits for the extent to which the head may be rotated on the stud 56. The shoulders are approximately 202° apart, so that the head can be rotated approximately 180° about the stud 56. Actual rotation of the head with reference to the stud is limited to approximately 180° because of the fact that the additional 22° gained by the 202° angle between the shoulders is taken up in the thickness of the grommet 75. A ring 80 is placed about the stud in a groove within that portion over which is placed the back of the head to form a dust and airtight seal.

To permit rotation of the head relative to the bracket and rotation of the stem relative to the bracket without damage to the capillary tube 32, the latter is provided with a pair of yieldable sections 82 and 84 located in the joint. The yieldable section 82 is in the form of a coil formed by a series of turns of the capillary tube arranged in tubular fashion about the bolt 48 within the sleeve 44 and the yieldable section 84 is in the form of a flat coil formed by turns of the capillary tube arranged in a common plane, the latter being situated in the bottom of the dish-shaped washer about the stud 56. There is sufficient resilience and yield in the cylindrical coil 82 to permit free rotation of the stem 34 about the bolt 48 without rupturing the capillary tube 32 and likewise, there is sufficient resilience and yield in the flat coil 84 to permit rotation of the head about the stud 56 without rupture of the capillary tube. The coils 82 and 84 are connected by a short rigid section 86 of the capillary tube which extends from one end of the coil 82 through the radial opening 54 in the disc 46 through an opening in the bridge portion of the bracket, an opening in the bottom of the dish-shaped washer and to the inside of the flat coil 84. The opposite end of the cylindrical coil 82 is connected to that portion of the capillary tube 32 extending into the stem and the outer portion of the flat coil 84 is bent to extend through the grommet 78 and is connected to the motor mechanism as heretofore indicated.

The foregoing construction provides a simple, yet rugged universal joint between the head and stem of an indicator instrument which permits passage of the capillary tube from the stem to the head through the joint in such a manner that there is little danger of rupture due to adjustment of the head relative to the stem even through prolonged use thereof.

It should be understood that the present disclosure is for the purpose of illustration only and that this invention includes all modifications and equivalents which fall within the scope of the appended claims.

I claim:

1. In an indicating instrument, a head having a transparent face behind which is a dial having indicia thereon which may be read through the face, a marker movable with reference to the indicia on the dial, a stem containing a fluid, a capillary tube extending from the stem into the head for transmitting pressure changes to the marker, a bracket having spaced leg portions joined by a bridge portion, means pivotally joining one end of the stem to and between the leg portions for rotation about an axis at right angles to the axis of the stem, means pivotally joining the head to the bridge portion for rotation about an axis passing through the center of and perpendicular to its face, said capillary tube having two coil portions joined by an uncoiled portion, said uncoiled portion extending through the bridge portion of the bracket, so that one coil lies at either side thereof, the coil at one side being yieldable about the axis of the pivot means joining the leg portions to the stem and the coil at the other side being yieldable about the axis of the means joining the head to the bridge portion.

2. In an indicating instrument, a casing having a transparent face behind which is a dial having indicia thereon which may be read through the face, a marker movable with reference to the indicia on the dial, a stem containing a fluid, an articulate bracket having a bridge portion and spaced legs substantially at right angles thereto, a pivot member connecting one end of the stem between the legs for rotation about an axis at right angles to the axis of the stem, a stud connecting the head to the bridge portion of the bracket for rotation about an axis passing through the center of and perpendicular to its face, a capillary tube extending from the stem into the head for transmitting changes in pressure to the marker, said capillary tube extending from the stem through said articulate bracket, a coil in the capillary tube located about the pivot member between the bracket legs and the stem, said coil being yieldable about the axis of said pivot member, a coil in said capillary tube located about the stud connecting the head to the bracket, said coil being yieldable about the axis of said stud, and said coils being joined by an integral portion of said tube within the bracket.

3. In an indicating instrument, a head containing an indicator responsive to fluid pressure changes, a stem containing a bulb within which is a fluid subject to pressure changes induced by ambient temperature changes, a bracket having a bridge portion and spaced legs substantially at right angles thereto, a spacer, a pivot member pivotally securing the spacer between said legs, said stem being fastened to the spacer, a stud fixed to the bridge portion, said head being mounted on the stud, a dished washer non-rotatably interposed between the bridge and head on the stud, with its dished side engaged with the bottom of the head, a capillary tube for transmitting changes in the fluid pressure within the bulb to the indicator, said tube having a cylindrical coil located in the spacer surrounding the pivot member joining the bracket to the spacer, and a flat coil located between the dished washer and the back of the head surrounding the stud joining the head to the bracket, said coils being joined by an integral portion of said tube passing through the bridge portion of the bracket and the washer.

4. In an indicating instrument, a head containing an indicator responsive to fluid pressure changes, a stem containing a bulb within which is a fluid subject to pressure changes induced by ambient temperature changes, a joint connecting said head to the stem and a capillary tube for transmitting a change of fluid pressure to the indicator through the joint, said joint comprising a bracket having a bridge portion and spaced legs substantially at right angles thereto, a cylindrical spacer sleeve disposed between said legs with its axis at right angles thereto, a pair of friction discs interposed between the ends of the sleeve and the legs, a bolt extending through the legs, discs and sleeve having a nut thereon by which the legs may be pressed toward the ends of the sleeve frictionally to engage the discs with the ends of the sleeve, said sleeve having an opening in its wall in which is secured one end of the stem, a dished washer non-rotatably mounted on the bridge portion of the bracket, a stud fixing the washer to the bridge portion and extending therefrom, said head being mounted on the stud for rotation relative to the washer about the axis of the stud, means on the stud frictionally resisting free rotation of the head, but permitting positive rotation thereof, and said capillary tube including a cylindrical coil in the sleeve around the bolt yieldable thereabout, and a flat coil between the washer and the head yieldable about said stud, said coils being joined by an integral portion of the tube extending through the bracket and washer.

5. In an indicating instrument a head containing an indicator, a stem containing an element sensitive to changes in ambient conditions, a joint connecting said head and stem and means for transmitting the response of said element to said indicator through the joint, said joint comprising a bracket having a bridge portion and spaced legs at substantially right angles thereto, a cylindrical spacer sleeve disposed between said legs with its axes at right angles thereto, a pair of friction discs interposed between the ends of the sleeve and the legs, a bolt extending through the legs, discs and sleeve having a nut thereon for drawing the legs together to permit the discs to be drawn into frictional engagement with the ends of the cylinder, a slot in one of the discs, a spur on one of the legs engaged with the slot, and preventing rotation thereof relative to the leg, said sleeve having an opening in it in which an end of the stem is fixed, a stud fixed to the bridge portion, a dish-shaped washer on the stud, said bridge portion having an opening therein and said washer having a nub engaged with said opening for non-rotatably holding the washer fixed with respect to the bridge, said head being rotatably mounted on the stud for rotation about the axis of the stud, a spring washer on the stud yieldably forcing the head into frictional engagement with the rim of the dish-shaped washer, a limit stop for limiting rotation of the head relative to the dish-shaped washer, said head having a hole in its back within the perimeter of the washer and said first means having coils, one of which is cylindrical and is located in the sleeve about the bolt and the other of which is flat and is located in the dish-shaped washer about the stud, said coils being joined by an integral portion extending through the slot in the disc, openings in the bridge and washer, and said means at the outer turn of the flat coil extending through the hole in the back of the head and being operably connected to the indicator in the head.

References Cited in the file of this patent

UNITED STATES PATENTS

| Number | Name | Date |
|---|---|---|
| 1,676,673 | Stalker | July 10, 1928 |
| 1,693,225 | Dunham | Nov. 27, 1928 |
| 1,733,804 | Ileman | Oct. 29, 1929 |
| 2,524,894 | Dobrin | Oct. 10, 1950 |